(12) United States Patent
Tin

(10) Patent No.: US 7,990,588 B2
(45) Date of Patent: Aug. 2, 2011

(54) METHOD OF FINDING LOOK-UP TABLE STRUCTURES IN COLOR DEVICE SAMPLING DATA

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 910 days.

(21) Appl. No.: 11/638,055

(22) Filed: Dec. 12, 2006

(65) Prior Publication Data

US 2008/0137112 A1    Jun. 12, 2008

(51) Int. Cl.
G03F 3/00 (2006.01)
G03F 3/10 (2006.01)
H04N 1/54 (2006.01)
H04N 1/60 (2006.01)
G09G 5/06 (2006.01)

(52) U.S. Cl. ........ 358/518; 358/500; 358/501; 358/504; 358/523; 358/1.9; 358/2.1; 358/3.23; 345/591; 345/593; 345/601; 345/602; 345/603; 345/604

(58) Field of Classification Search ................... 358/500, 358/501, 504, 518, 523, 1.9, 2.1, 3.23; 345/591, 345/593, 601, 602, 603, 604
See application file for complete search history.

(56) References Cited

U.S. PATENT DOCUMENTS

| | | | |
|---|---|---|---|
| 5,483,360 A | | 1/1996 | Rolleston et al. |
| 5,644,509 A * | | 7/1997 | Schwartz ............ 358/518 |
| 5,809,213 A * | | 9/1998 | Bhattacharjya ............ 358/1.6 |
| 5,982,990 A * | | 11/1999 | Gondek ............ 358/1.9 |
| 6,011,540 A * | | 1/2000 | Berlin et al. ............ 345/601 |
| 6,023,351 A * | | 2/2000 | Newman ............ 358/524 |
| 6,304,671 B1 * | | 10/2001 | Kakutani ............ 382/167 |
| 6,525,723 B1 * | | 2/2003 | Deering ............ 345/419 |
| 6,657,746 B1 | | 12/2003 | Fuchigami et al. |
| 6,705,703 B2 | | 3/2004 | Zeng et al. |
| 7,233,413 B2 * | | 6/2007 | Jones et al. ............ 358/1.9 |
| 7,652,789 B2 * | | 1/2010 | Berns et al. ............ 358/1.9 |
| 2001/0038459 A1 * | | 11/2001 | Mahy ............ 358/1.9 |
| 2003/0063096 A1 * | | 4/2003 | Burke ............ 345/582 |
| 2003/0090726 A1 * | | 5/2003 | Arai ............ 358/2.1 |
| 2004/0263879 A1 * | | 12/2004 | Ito et al. ............ 358/1.9 |
| 2006/0164430 A1 * | | 7/2006 | Tin et al. ............ 345/602 |
| 2006/0268297 A1 * | | 11/2006 | Han ............ 358/1.9 |
| 2007/0030505 A1 * | | 2/2007 | Ito et al. ............ 358/1.9 |
| 2007/0070465 A1 * | | 3/2007 | Tzeng et al. ............ 358/518 |
| 2007/0127074 A1 * | | 6/2007 | Hayaishi ............ 358/3.01 |

* cited by examiner

*Primary Examiner* — David K Moore
*Assistant Examiner* — Beniyam Menberu
(74) *Attorney, Agent, or Firm* — Fitzpatrick, Cella, Harper & Scinto

(57) ABSTRACT

Determination of a grid structure for a set of values in a device color space, in which heuristics are applied to a collection of color sample data in order to determine the structure of a look-up table that best fits the samples. Sampling data is sorted for each channel thereof, and the number of steps in each channel is counted. The data is checked for completeness. Steps are removed if they do not correspond to steps on the axes of a three-dimensional cube. If, as a result of step removal, a full LUT has been obtained, then the structure of the LUT has been determined and the process ends. On the other hand, if a full LUT has not been obtained, then steps are removed if they are under-correlated with other steps.

27 Claims, 6 Drawing Sheets

METHOD OF FINDING LOOK-UP TABLE STRUCTURES IN COLOR DEVICE SAMPLING DATA

BACKGROUND

1. Field of the Invention

The present invention relates generally to color device modeling and specifically to determining a format of samples of a color device space in order to create a color device model.

2. Description of the Related Art

Color device modeling usually entails sampling the device space and taking measurements. For a printer that uses Red, Green and Blue (RGB) as an interface (a so-called "RGB printer"), this could mean sampling the RGB space uniformly using a 9×9×9 grid, for instance, and measuring each color patch with a spectrophotometer. The use of a complete sampling grid is not strictly speaking a necessity, but it allows efficient interpolation algorithms, such as a tetrahedral interpolation algorithm, to be used later on in the device model building.

For devices with more channels, a full sampling grid may not be desirable. For a Cyan, Magenta, Yellow and blacK (CMYK) printer, a 9×9×9×9 sampling grid would mean printing and measuring 6561 patches. This is quite time consuming. It has been observed that for practical purposes, it is more efficient to use denser sampling for low blacK (K) levels and coarser sampling for high K levels. The ANSI IT8.7/3 target is designed with this in mind. The target does not contain randomly placed samples, however. There is still regularity within a particular K level, and one can indeed find a complete Look Up Table (LUT) structure on each K level.

If the layout of a target is known, it is possible to pre-determine the LUTs contained in the target, even by human inspection. In other words, if it is known the target is an IT8.7/3 target, then the K levels are known as well as the CMY LUTs on each K level.

However, a general problem exists that a sampled target may not be known when a color management system is implemented. One possible cause for this could be because a sampled target is not a standard target, which would be the case for multi-channel printer devices because the industry has not standardized on a multi-channel printer device characterization target yet. It could also be because the target only comes out after the system (e.g. software) is built. It would of course be nice for a system to support future targets. To meet this goal, hardcoding the locations of sampling points for LUTs is not desirable.

There is therefore a need to devise an adaptive method that would take a set of data points, perform analysis and determine the LUTs contained in the dataset. Various aspects of the present invention meet such a need.

SUMMARY OF THE INVENTION

A method and apparatus for determining a grid structure for a set of values in a device color space is provided. In one aspect of the invention, an ordered set of values is generated for each channel in the set of values and values are removed from the set of values in the device color space on a basis of a correlation between the sets of ordered values.

In another aspect of the invention, a value is selected for removal if the value has the lowest correlation value of all of the values in the set of values.

In another aspect of the invention, the correlation is determined on the basis of an overall correlation value based on a minimum correlation value for each of the ordered sets of values.

In another aspect of the invention, a determination is made if there are a minimal number of steps in each channel. If not, an error condition is raised.

In another aspect of the invention, a determination is made if the channels include both the zero and the one value when the values for each channel are normalized to the unit range. If not, an error condition is raised.

In another aspect of the invention, a determination is made if the set of values in a device color space include eight corner points of a three-dimensional color cube.

In another aspect of the invention, a step value is removed if the set of values in a device color space does not include a point with the step value in the channel and zero or one in the other channels.

BRIEF DESCRIPTION OF THE DRAWINGS

The present invention will be more readily understood from a detailed description of the preferred embodiment taken in conjunction with the following figures.

DETAILED DESCRIPTION

Figure 1:
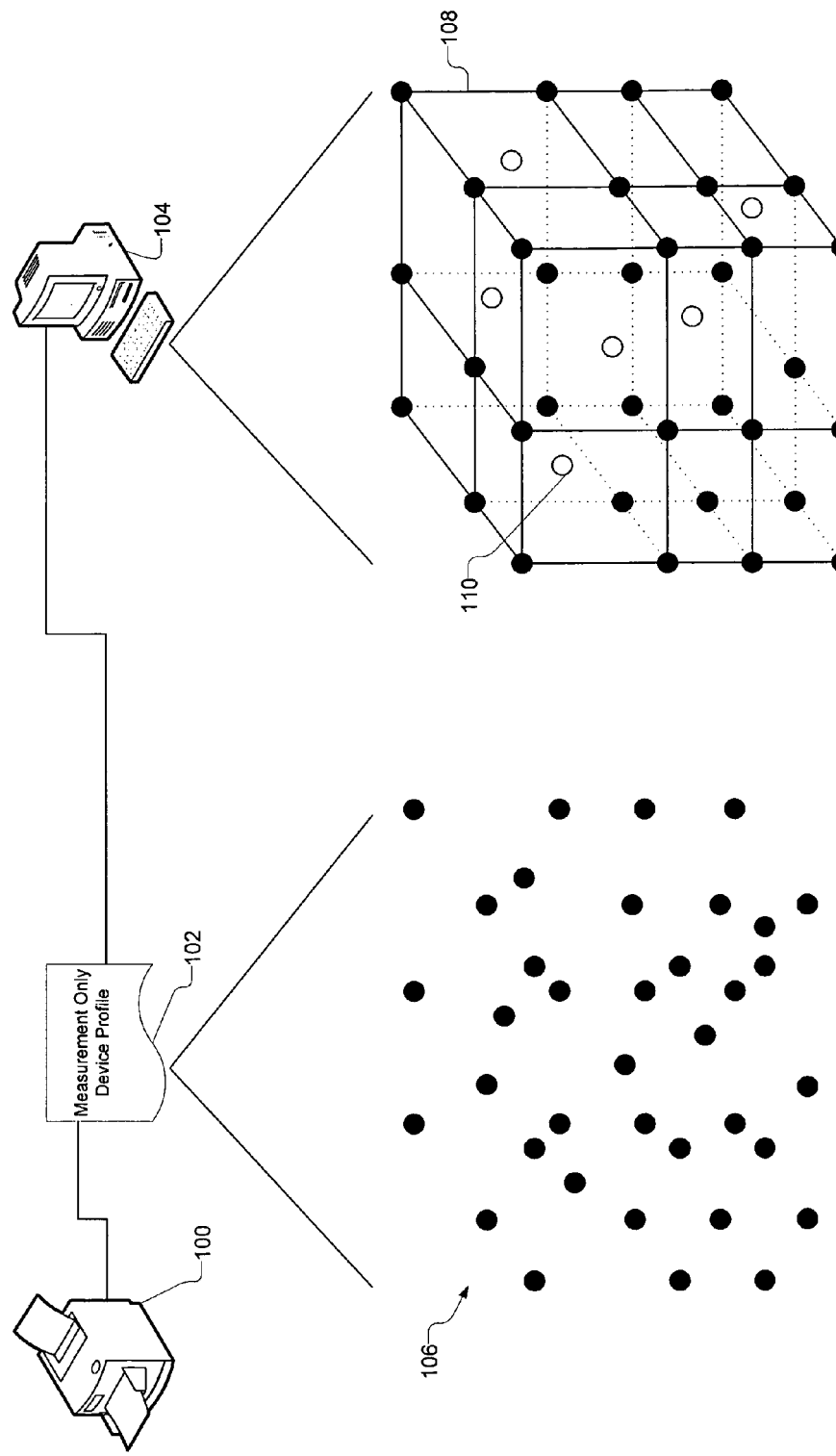
FIG. 1 is a system diagram illustrating finding a look-up table structure in color device sampling data in accordance with an exemplary embodiment of the invention.

FIG. 1 is a system diagram illustrating finding a look-up table structure in color device sampling data in accordance with an exemplary embodiment of the invention. A Measurement Only device Profile (MOP) 102 describes the response of an output color device 100, such as an RGB color printer. The MOP 102 includes a set of sampling points 106 in a 3D device space that are used to build Look Up Tables (LUTs) used by a computer system 104 in constructing a color space transformation for use in a printer driver for the color device 100. To do so, the data processing system determines a LUT 108 that is contained in the set of sampling points. If the sampling of the 3D device space is other than a full LUT sampling, then a LUT can still be determined from the set of sample points The determined LUT 108 may exclude some of the original sampling points, such as sampling point 110.

In the case that the sampling is of Cyan Magenta Yellow black (CMYK) space (such as IT8.7/3 target), the computer system 104 treats the set of sampling points as a sampling of many CMY spaces at chosen K levels. So the method can still be applied to device spaces of higher dimensions. A similar technique can also be used for six-ink printers or other multi-channel devices, if the data processing system 104 first sorts the sampling points into sets with the same values in all channels but three, and applies the algorithm to each set, resulting in a series of 3D LUTs.

The sought for 3D LUT will now be precisely defined as used herein. A 3D LUT can be defined in the following way. For complete generality, a general device color space is termed as ABC herein having three channels A, B and C. Without loss of generality, in a set of sampling points for the device color space, the sampling points are scaled such that the range in each channel is [0, 1]. For example, if the color device accepts 8 bit data as input, then one would normalize the values by 255. Furthermore, in a 3D LUT, there are three 1D sampling grids, for channel A: $a_1, a_2, \ldots a_{N(A)}$,
for channel B: $b_1, b_2, \ldots b_{N(B)}$, and
for channel C: $c_1, c_2, \ldots c_{N(C)}$.

The number of steps in each channel, N(A), N(B) and N(C) may not be the same. Moreover, the LUT must be "complete", in the sense that every point $(a_i, b_j, c_k)$, $i=1, \ldots N(A)$, $j=1, \ldots N(B)$, $k=1, \ldots N(C)$ must also be present in the samples. This type of LUT is sometimes called non-uniform LUT, if there is any chance of confusion. In addition, the condition that $a_1=b_1=c_1=0$, $a_{N(A)}=b_{N(B)}=c_{N(C)}=1$ is imposed. This is not a serious restriction, and if it is not satisfied, it means some part of the device space is not sampled, something that should be avoided in the design of targets.

Having described a 3D LUT 108 and the requirements for the sampling points 106, the goal of the data processing system 104 is then, given a set of sample points S 106, find a 3D LUT 108 in the sense above, with N(A), N(B), N(C) as large as possible.

Figure 2:
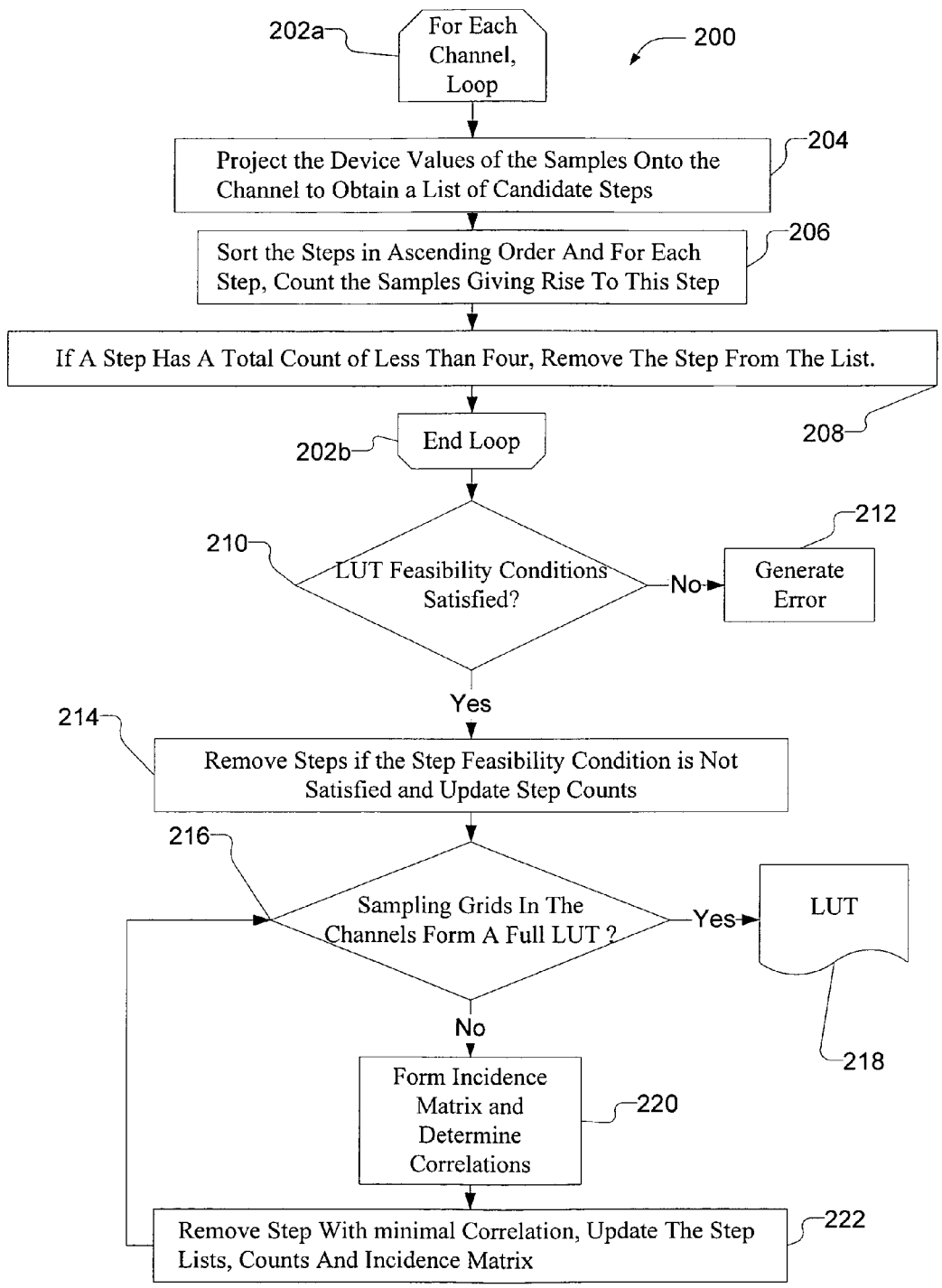
FIG. 2 is a process flow diagram of a process for finding a look-up table structure in color device sampling data for a 3D device space in accordance with an exemplary embodiment of the invention.

FIG. 2 is a process flow diagram of a process for finding a look-up table structure in color device sampling data in accordance with an exemplary embodiment of the invention. The process 200 begins by taking each channel in turn (202a to 202b) and projecting (204) every point in a set of sampling points S onto the channel, resulting in a list of candidate steps. The steps are then sorted in ascending order of magnitude (206). For each step in the channel, the number of samples that give rise to the step are also counted. If a step has total count of less than 4 (that is, 2*2), then the step is removed (208) from the list. The reason for this is that a step cannot possibly be in the sought after LUT because there has to be at least a 2×2 LUT in the plane containing this step.

At the end of this procedure, there will be an ascending list of candidate steps in each channel, the sample count of each of which should be $\geq 4$. In the above-defined ABC device space, then channel A includes steps $\alpha_1 < \alpha_2 < \ldots < \alpha_K$. Similarly, channel B gives steps $\beta_1 < \beta_2 < \ldots < \beta_L$. Similarly, channel C gives steps $\gamma_1 < \gamma_2 < \ldots < \gamma_M$.

After the ordered lists are created, the ordered lists are checked (210) to determine if the ordered lists satisfy a set of necessary LUT feasibility conditions that must be satisfied for the sought after LUT to exist, that is:

(a) $K \geq 2$ and $L \geq 2$ and $M \geq 2$. If these are not satisfied, there aren't enough steps to form a LUT. If so, the process generates (212) an error code.

(b) $\alpha_1=0$, $\alpha_K=1$, $\beta_1=0$, $\beta_L=1$, $\gamma_1=0$ and $\gamma_M=1$. If these are not satisfied, the sample points are missing a boundary point. Again the process generates (212) an error.

(c) All of the 8 "corner points", namely: $(\alpha_1, \beta_1, \gamma_1)$, $(\alpha_1, \beta_1, \gamma_1)$, $(\alpha_1, \beta_L, \gamma_1)$, $(\alpha_1, \beta_L, \gamma_M)$, $(\alpha_K, \beta_1, \gamma_1)$, $(\alpha_K, \beta_1, \gamma_M)$, $(\alpha_K, \beta_L, \gamma_1)$, $(\alpha_K, \beta_L, \gamma_M)$ are in the samples. If not, the process generates (212) an error.

Next, the process removes (214) any of the steps $\{\alpha_i\}$, $\{\beta_j\}$, $\{\gamma_k\}$ if a step feasibility condition is not satisfied. The step feasibility condition imposes a necessary condition that, for a step to be present in the sought after LUT, the set of sampling points in the device color space must include every point with the step value in the channel and zero or one in the other channels. More precisely, if any of the four points from the combinations $\{\alpha_i\} \times \{0,1\} \times \{0,1\}$ are not in the samples, remove $\alpha_i$. If any of the four points from the combinations $\{0,1\} \times \{\beta_j\} \times \{0,1\}$ are not in the samples, remove $\beta_j$. If any of the four points from the combinations $\{0,1\} \times \{0,1\} \times \{\gamma_k\}$ are not in the samples, remove $\gamma_k$. If a step is removed, update the step counts K, L, M for the channels.

The process then determines (216) if the 1D sampling grids in the A, B and C channels form a full LUT 218. If so, the process is completed.

However, if the 1D sampling grids in the A, B and C channels do not form a full LUT, the process removes a step from channel A, B or C. The step to be removed is a step with minimal "Correlation" with other channels. The notion of Correlation can be defined most easily with the auxiliary notion of "Incidence Matrix". The Incidence Matrix $\Im$ at each iterative step is defined as a 3D array of size K×L×M:

$$\Im[i, j, k] = \begin{cases} 1 & \text{if } (\alpha_i, \beta_j, \gamma_k) \text{ is in the samples} \\ 0 & \text{otherwise} \end{cases}$$

Then the Correlation of the ith step in the channel A is defined as $$Corr_A(i) = \sum_{j=1}^{L} \sum_{k=1}^{M} \Im[i, j, k]/LM$$

Similarly, the Correlation in channel B and C are defined as $$Corr_B(j) = \sum_{i=1}^{K} \sum_{k=1}^{M} \Im[i, j, k]/KM$$

$$Corr_C(k) = \sum_{i=1}^{K} \sum_{j=1}^{L} \Im[i, j, k]/KL$$

The Correlation can be visualized as the fraction of completion in the AB, BC or AC plane.

After the step with minimal Correlation is removed (222) (the step may not be unique), the step lists are updated, including the counts K, L and M, and also the Incidence Matrix. Then the process continues by determining (216) if the 1D sampling grids in the A, B and C channels form a full LUT 218. This process will terminate in finitely many steps, because in the worst case, there will be a 2×2×2 LUT, which is guaranteed by the LUT feasibility conditions checked at step 210.

As is apparent from the foregoing discussion, the process imposes no unnecessary conditions other than the minimal condition that a LUT has to have at least two steps in each channel. Furthermore, the process has the advantage that the process discovers the format of a target instead of assuming it, which allows a data processing system to support proprietary formats or future standard formats, both of which may be unknown at the time the data processing system is implemented.

Figure 3:
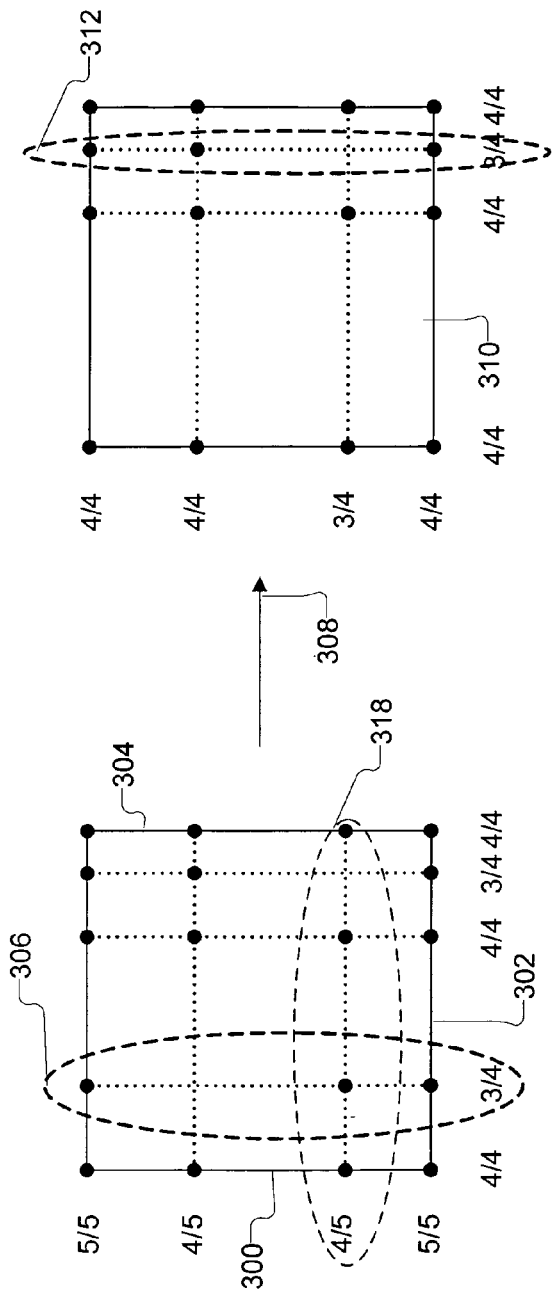
FIG. 3 is a 2-dimensional illustration of correlation processing used in a process for finding a look-up table structure in color device sampling data in accordance with an exemplary embodiment of the invention.
Figure 3:
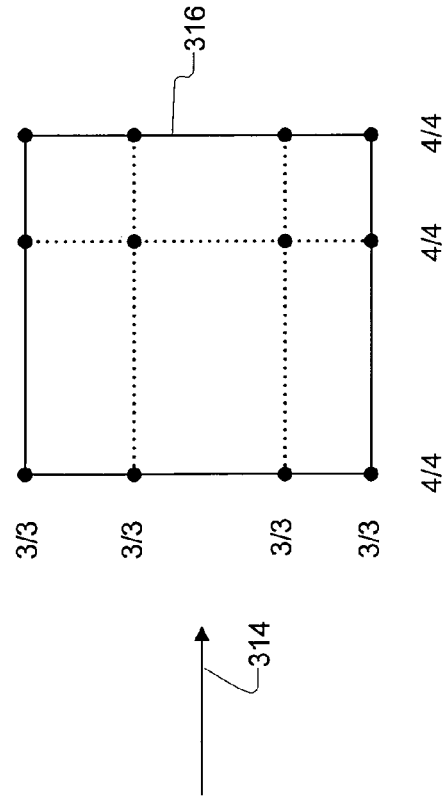

FIG. 3 is a 2-dimensional illustration of Correlation processing used in a process for finding a look-up table structure in color device sampling data in accordance with an exemplary embodiment of the invention. In the illustration, a sampling of a first channel 300 and a second channel 302 of a 2D device space is shown. In an initial sampling 304, a step has been identified 306 in the second channel which only correlates three out of a possible four sets of values with the first channels. As such, this step is removed (308), from the initial sampling, creating an interim sampling 310. Then, another step 312 is identified having a low correlation and is removed (314). This leaves a full LUT 316.

It will be readily apparent that there may be multiple possible computation paths depending on the order of processing of the channels. For example, referring again to the initial sampling 304, if the first channel were processed first, a different step 318 would have been identified and removed, resulting in a different final LUT. That is, at each iteration, there can be several steps with the same minimal Correlation and the choice of which step to remove is left as an implementation detail.

In one variation of the process, the desired LUT has the same sampling steps in all channels, that is, N(A)=N(B)=N(C) and $a_i=b_i=c_i$ for all i. The motivation for this additional constraint may be that the resulting LUT would be more "balanced" in every channel.

Referring again to FIG. 2, the process 200 can be altered to achieve the goal of finding a LUT with these properties. In step 214, the process removes any of the steps $\{\alpha_i\}$, $\{\beta_j\}$, $\{\gamma_k\}$ unless the same step appears in all of the channels. Furthermore, the step feasibility condition is modified as follows. The process removes a step $\alpha_i$ if any of 27 points resulting from the combinations $\{0,\alpha_i,1\}\times\{0,\alpha_i,1\}\times\{0,\alpha_i,1\}$ are not in the samples. At the end of this procedure, the three step lists are identical, which can be described as $\alpha_1<\alpha_2<\ldots<\alpha_K$, where K is the updated count.

Now, during steps 220 and 222, another correlation, herein termed an Overall Correlation, is used. The Overall Correlation is defined as $OCorr(i)=\min(Corr_A(i), Corr_B(i), Corr_C(i))$. In an actual implementation, it is more efficient to ignore the denominator in $Corr_A$, $Corr_B$ and $Corr_C$ because K=L=M. The step with minimal OCorr is removed in this iteration. And when a step is removed, the step is removed it from every channel.

As before, the step list is updated, including the count K, and also the Incidence Matrix, then the remaining sampling is checked at step 216. Again, as before, this process must terminate in finitely many steps, because in the worst case, there will be a 2×2×2 LUT in the sampling, which is guaranteed by the checking done in step 210.

Figure 4:
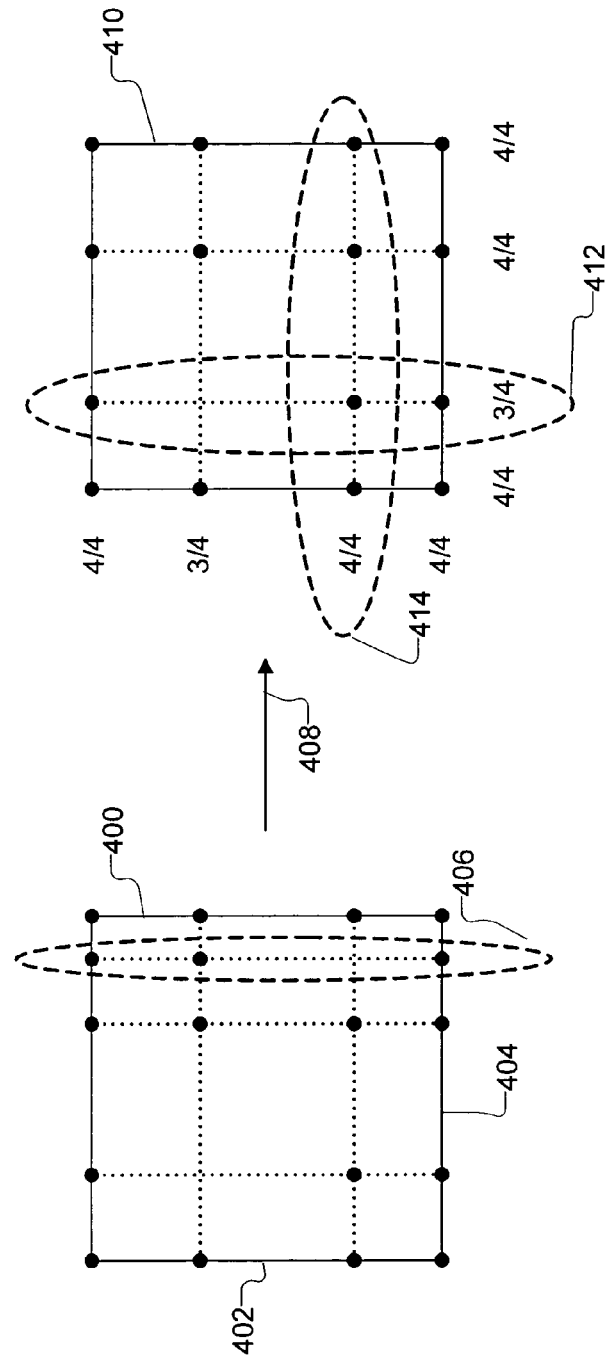
FIG. 4 is another 2-dimensional illustration of overall correlation processing in a process for finding a look-up table structure in color device sampling data in accordance with an exemplary embodiment of the invention.
Figure 4:
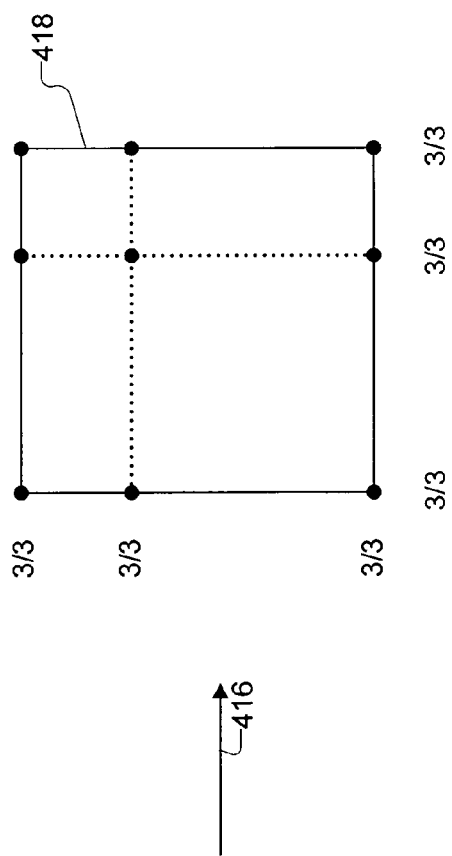

FIG. 4 is another 2-dimensional illustration of Overall Correlation processing in a process for finding a look-up table structure in color device sampling data in accordance with an exemplary embodiment of the invention. As illustrated, an initial sampling 400 includes steps along a first channel 402 and a second channel 404. As step 406 appears in the second channel but not the first, step 406 is removed (408) leaving an interim sampling 410. Next, a step is identified having the lowest 412 Overall Correlation and is removed (416) along with the corresponding step 414 in the other channel. This results in the final LUT 418.

Figure 5:
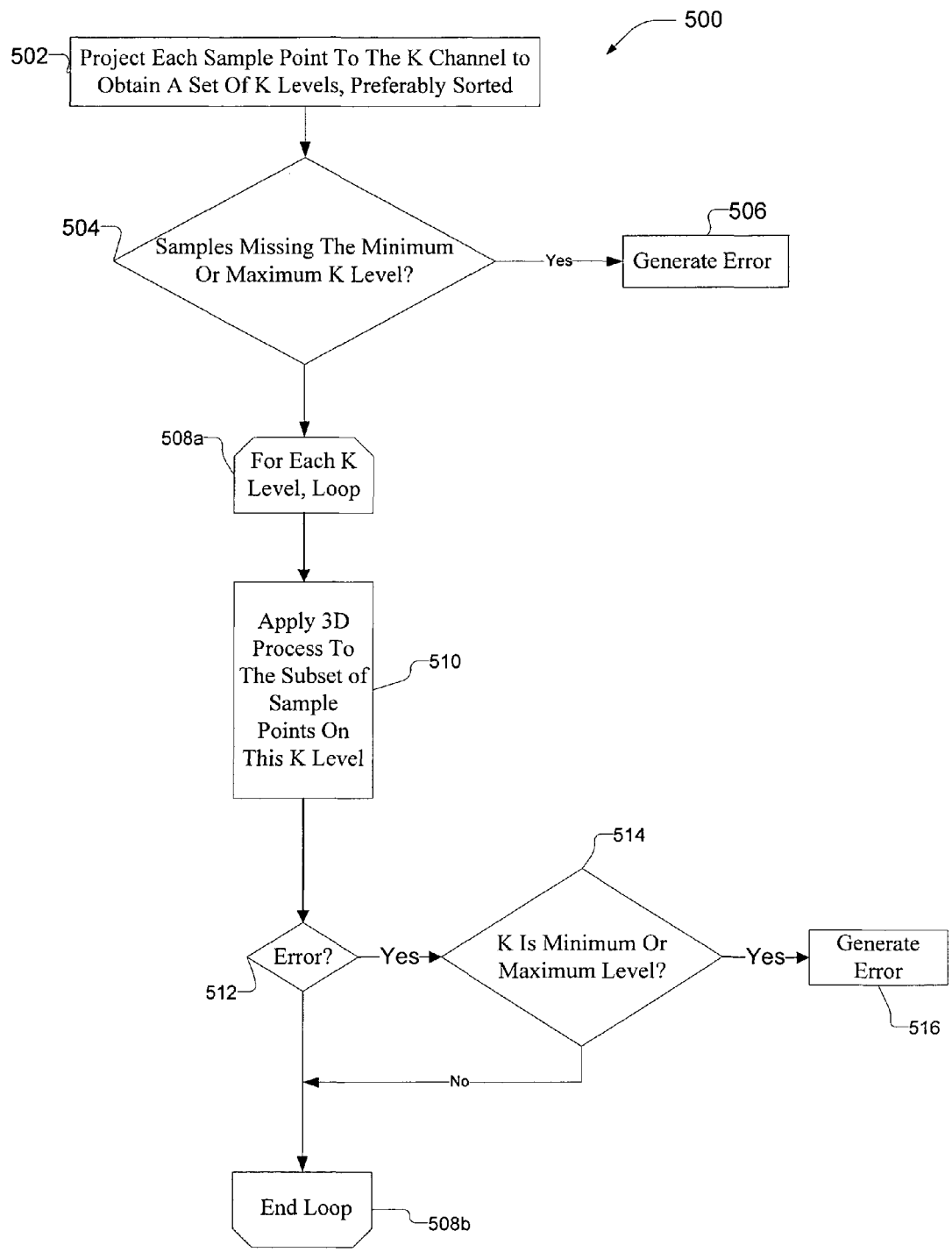
FIG. 5 is a process flow diagram of a process for finding a look-up table structure in color device sampling data for a 4D device space in accordance with an exemplary embodiment of the invention.

FIG. 5 is a process flow diagram of a process for finding a look-up table structure in color device sampling data for a 4D device space in accordance with an exemplary embodiment of the invention. The process is useful for processing CMYK samples. The CMYK samples can be thought of as sets of CMY samples at different K levels. Therefore, it is possible to apply the 3D process from above to the CMY samples.

The process 500 begins by projecting (502) each sample point to the K channel to obtain a set of K levels, preferably sorted: $k_1<k_2<\ldots<k_N$.

If it is determined (504) that $k_1\neq 0$ or $k_N\neq 1$, then the samples are missing the minimum or maximum K level. If so, an error is generated (506) and the process terminates as there is an error in the dataset.

Now, for each black level $k_i$ (508a to 508b), the 3D process described above is applied (510) to the subset of sample points with $K=k_i$. If it is determined (512) that the 3D process has succeeded, iteration continues with the next K level. If the result is an error condition, then it is further determined (514) if the current K level is the minimum or maximum level. If so, an error is generated (516). Otherwise, iteration continues with the next K level. The same scheme can be applied to a multi-channel printer in an obvious way, if all but three channels at a time are fixed, resulting in a series of 3D LUTs.

Figure 6:
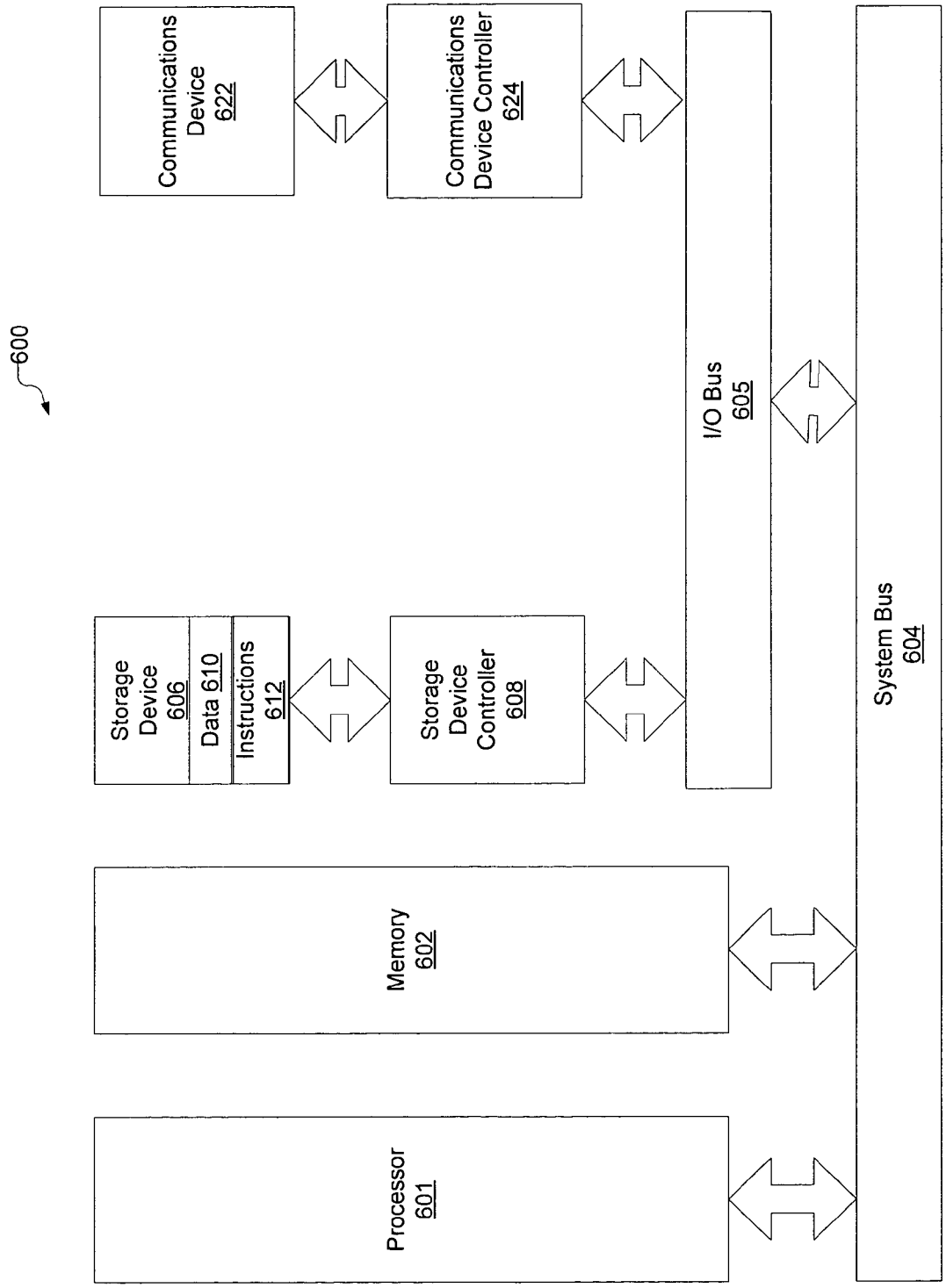
FIG. 6 is an architecture diagram for a data processing system, such as a general purpose computing machine suitable for hosting a process for finding a look-up table structure in color device sampling data in accordance with an exemplary embodiment of the invention.

FIG. 6 is an architecture diagram for a data processing system, such as a general purpose computing machine or computer, suitable for hosting a process for finding a look-up table structure in color device sampling data in accordance with an exemplary embodiment of the invention. The data processing system 600 includes a processor 601 coupled to a memory 602 via system bus 604. The processor is also coupled to Input/Output (I/O) devices via the system bus and an I/O bus 605. A storage device 606 having data processing system readable media is coupled to the processor via a storage device controller 608 and the I/O bus and the system bus. The storage device is used by the processor to store and read data 610 and data processing system executable program instructions 612 used to implement the features of the process for finding a look-up table structure in color device sampling data as described above.

The processor may be further coupled to a communications device 622 via a communications device controller 624 coupled to the I/O bus. The processor uses the communications device to communicate with a color device as previously described.

In operation, the processor loads the program instructions from the storage device into the memory. The processor executes the loaded program instructions to receive sampling data and find a LUT as described above.

The present invention has been described above with respect to particular illustrative embodiments. It is understood that the present invention is not limited to the above-described embodiments and that various changes and modifications may be made by those skilled in the relevant art without departing from the spirit and scope of the invention.

What is claimed is:

1. A method of determining a grid structure for an N-dimensional device color space, where N is two or more, comprising:
   performing, by a processor, steps of:
   obtaining a set of sampling points of the same dimensionality as the N-dimensional device color space, the sampling points being used for determining a list of candidate steps for each dimension of the N-dimensional device color space;

generating for each of the candidate steps a correlation as a fraction of completion of a plane in the N-dimensional device color space that passes through a value of the candidate step;

generating a set of ordered values for each dimension of the N-dimensional device color space by removing a candidate step that has a lowest correlation for any single iteration, thereby generating plural sets of ordered values;

determining the grid structure for the N-dimensional device color space using the sets of ordered values; and constructing a color conversion lookup table (LUT) at the determined grid structure.

2. The method of claim 1, wherein generating for each of the candidate steps a correlation and removing the candidate step that has the lowest correlation are performed repeatedly until the sets of ordered values form a full LUT.

3. The method of claim 1, further comprising:
determining a first step value from a first set of the sets of ordered values;
determining if the first step value is found in each of the other sets of ordered values; and
removing values in all of the sets of ordered values that correspond to the first step value if the first step value is not found in each of the other sets of ordered values.

4. The method of claim 3, wherein the correlation is determined on the basis of an overall correlation value based on a minimum correlation value for each of the sets of ordered values.

5. The method of claim 3, further comprising removing a step value from all the sets of ordered values if the set of sampling points in the N-dimensional device color space does not include any point with the value of zero, the step value or the value of one in a dimension of the N-dimensional device color space.

6. The method of claim 1, further comprising determining if there are a minimal number of steps in each dimension of the N-dimensional device color space.

7. The method of claim 1, further comprising determining if the set of ordered values for each dimension of the N-dimensional device color space includes both the value of zero and the value of one.

8. The method of claim 1, further comprising determining if the set of sampling points in the N-dimensional device color space includes $2^N$ corner points of an N-dimensional color cube.

9. The method of claim 1, further comprising removing a step value in a dimension of the N-dimensional device color space from the corresponding set of ordered values if the set of sampling points in the N-dimensional device color space does not include a point with the step value in the dimension of the N-dimensional device color space and zero or one in other dimensions of the N-dimensional device color space.

10. An apparatus for determining a grid structure for an N-dimensional device color space, where N is two or more, comprising:
means for obtaining a set of sampling points of the same dimensionality as the N-dimensional device color space, the sampling points being used for determining a list of candidate steps for each dimension of the N-dimensional device color space;
means for generating for each of the candidate steps a correlation as a fraction of completion of a plane in the N-dimensional device color space that passes through a value of the candidate step;
means for generating a set of ordered values for each dimension of the N-dimensional device color space by removing a candidate step that has a lowest correlation for any single iteration, thereby generating plural sets of ordered values;
means for determining the grid structure for the N-dimensional device color space using the sets of ordered values; and
means for constructing a color conversion lookup table (LUT) at the determined grid structure.

11. The apparatus of claim 10, wherein generating for each of the candidate steps a correlation and removing the candidate step that has the lowest correlation are performed repeatedly until the sets of ordered values form a full LUT.

12. The apparatus of claim 10, further comprising:
means for determining a first step value from a first set of the sets of ordered values;
means for determining if the first step value is found in each of the other sets of ordered values; and
means for removing values in all of the sets of ordered values that correspond to the first step value if the first step value is not found in each of the other sets of ordered values.

13. The apparatus of claim 12, wherein the correlation is determined on the basis of an overall correlation value based on a minimum correlation value for each of the sets of ordered values.

14. The apparatus of claim 12, further comprising means for removing a step value from all the sets of ordered values if the set of sampling points in the N-dimensional device color space does not include any point with the value of zero, the step value or the value of one in a dimension of the N-dimensional device color space.

15. The apparatus of claim 10, further comprising means for determining if there are a minimal number of steps in each dimension of the N-dimensional device color space.

16. The apparatus of claim 10, further comprising means for determining if the set of ordered values for each dimension of the N-dimensional device color space includes both the value of zero and the value of one.

17. The apparatus of claim 10, further comprising means for determining if the set of sampling points in the N-dimensional device color space includes $2^N$ corner points of an N-dimensional color cube.

18. The apparatus of claim 10, further comprising means for removing a step value in a dimension of the N-dimensional device color space from the corresponding set of ordered values if the set of sampling points in the N-dimensional device color space does not include a point with the step value in the dimension of the N-dimensional device color space and zero or one in other dimensions of the N-dimensional device color space.

19. A computer-readable storage device storing computer-executable program for a method of determining a grid structure an N-dimensional device color space, where N is two or more, comprising:
obtaining a set of sampling points of the same dimensionality as the N-dimensional device color space, the sampling points being used for determining a list of candidate steps for each dimension of the N-dimensional device color space;
generating for each of the candidate steps a correlation as a fraction of completion of a plane in the N-dimensional color space that passes through a value of the candidate step;
generating a set of ordered values for each dimension of the N-dimensional device color space by removing a candidate step that has a lowest correlation for any single iteration, thereby generating plural sets of ordered values;

determining the grid structure of the N-dimensional device color space using the sets of ordered values; and constructing a color conversion lookup table (LUT) at the determined grid structure.

20. The computer-readable storage device of claim 19, wherein generating for each of the candidate steps a correlation and removing the candidate step that has the lowest correlation are performed repeatedly until the sets of ordered values form a full LUT.

21. The computer-readable storage device of claim 19, the computer-executable program further comprising:

determining a first step value from a first set of the sets of ordered values;

determining if the first step value is found in each of the other sets of ordered values; and removing values in all of the sets of ordered values that correspond to the first step value if the first step value is not found in each of the other sets of ordered values.

22. The computer-readable storage device of claim 21, wherein the correlation is determined on the basis of an overall correlation value based on a minimum correlation value for each of the sets of values.

23. The computer-readable storage device of claim 21, further comprising removing a step value from all the sets of ordered values if the set of sampling points in the N-dimensional device color space does not include any point with the value of zero, the step value or the value of one in a dimension of the N-dimensional device color space.

24. The computer-readable storage device of claim 19, the computer-executable program further comprising determining if there are a minimal number of steps in each dimension of the N-dimensional device color space.

25. The computer-readable storage device of claim 19, the computer-executable program further comprising determining if the set of ordered values for each dimension of the N-dimensional device color space includes both the value of zero and the value of one.

26. The computer-readable storage device of claim 19, the computer-executable program further comprising determining if the set of sampling points in the N-dimensional device color space includes $2^N$ corner points of an N-dimensional color cube.

27. The computer-readable storage device of claim 19, the computer-executable program further comprising removing a step value in a dimension of the N-dimensional device color space from the corresponding set of ordered values if the set of sampling points in the N-dimensional device color space does not include a point with the step value in the dimension of the N-dimensional device color space and zero or one in other dimensions of the N-dimensional device color space.

* * * * *